US012599800B2

(12) United States Patent (10) Patent No.: US 12,599,800 B2
Hickman et al. (45) Date of Patent: Apr. 14, 2026

(54) PROCESSES FOR REMOVING PERFLUOROALKYL SUBSTANCES AND REGENERATING AN ADSORBENT USED WITH SAME

(71) Applicant: UOP LLC, Des Plaines, IL (US)

(72) Inventors: Amanda J. Hickman, Evanston, IL (US); Erin M. Broderick, Arlington Heights, IL (US); Susan C. Koster, Carpentersville, IL (US); Benjamin D. Yuhas, Evanston, IL (US); Aric G. Fisher, Tulsa, OK (US); William J. Whyman, Collinsville, OK (US); Gregory B. Kuzmanich, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 612 days.

(21) Appl. No.: 18/064,025

(22) Filed: Dec. 9, 2022

(65) Prior Publication Data

US 2024/0189644 A1 Jun. 13, 2024

(51) Int. Cl.
*A62D 3/36* (2007.01)
*A62D 101/22* (2007.01)
(Continued)

(52) U.S. Cl.
CPC ............. *A62D 3/36* (2013.01); *B01D 15/203* (2013.01); *B01J 20/16* (2013.01); *B01J 20/20* (2013.01); *B01J 20/3416* (2013.01); *B01J 20/345* (2013.01); *B01J 20/3483* (2013.01); *B01J 49/40* (2017.01); *B01J 49/50* (2017.01);

*C02F 1/281* (2013.01); *C02F 1/283* (2013.01); *C02F 1/42* (2013.01); *A62D 2101/22* (2013.01); *C02F 2101/36* (2013.01); *C02F 2303/16* (2013.01)

(58) Field of Classification Search
None
See application file for complete search history.

(56) References Cited

U.S. PATENT DOCUMENTS 9,132,306 B2 9/2015 Huang et al.
11,072,574 B2 7/2021 Gu et al.
(Continued)

FOREIGN PATENT DOCUMENTS

CN 111256144 A 6/2020
CN 111569856 A 8/2020
(Continued)

OTHER PUBLICATIONS

International Search Report from corresponding PCT application No. PCT/US2023/082718, mailed Apr. 9, 2024.
(Continued)

*Primary Examiner* — John J Figueroa

(57) ABSTRACT

Processes and apparatuses for degrading PFAS into calcium fluoride, carbon dioxide, and water. PFAS are heated and introduced to a calcium base which will degrade the PFAS. The PFAS may be in a stream that is a PFAS enriched stream formed by desorbing the PFAS from an adsorbent which removed the PFAS from a contaminant stream. The PFAS may be desorbed in the presence of the calcium base. The calcium base may be calcium hydroxide, calcium oxide, calcium carbonate, or combinations thereof.

9 Claims, 4 Drawing Sheets

(51) Int. Cl.

| | |
|---|---|
| *B01D 15/20* | (2006.01) |
| *B01J 20/16* | (2006.01) |
| *B01J 20/20* | (2006.01) |
| *B01J 20/34* | (2006.01) |
| *B01J 49/40* | (2017.01) |
| *B01J 49/50* | (2017.01) |
| *C02F 1/28* | (2023.01) |
| *C02F 1/42* | (2023.01) |
| *C02F 101/36* | (2006.01) |

(56) References Cited

U.S. PATENT DOCUMENTS

| | | | |
|---|---|---|---|
| 2016/0319216 A1* | 11/2016 | Hutchenson | B01D 11/0407 |
| 2020/0155885 A1 | 5/2020 | Strathmann et al. | |
| 2021/0139354 A1 | 5/2021 | Dejarme et al. | |
| 2021/0207049 A1 | 7/2021 | Larson et al. | |
| 2021/0308661 A1 | 10/2021 | Hart et al. | |

| | | | |
|---|---|---|---|
| 2021/0346862 A1 | 11/2021 | Georgi et al. | |
| 2022/0227644 A1* | 7/2022 | Santillan | C02F 1/281 |

FOREIGN PATENT DOCUMENTS

| | | |
|---|---|---|
| JP | 2006248823 A | 9/2006 |
| WO | 2020206317 A1 | 10/2020 |

OTHER PUBLICATIONS

Written Opinion from corresponding PCT application No. PCT/US2023/082718, mailed Apr. 9, 2024.

Theran P. Riedel, et al., Low temperature thermal treatment of gas-phase fluorotelomer alcohols by calcium oxide, Chemosphere 272 (2021) 129859.

Fei Wang et al., Effectiveness and Mechanisms of Defluorination of Perfluorinated Alkyl Substances by Calcium Compounds during Waste Thermal Treatment, Environ. Sci. Technol., 2015, 49, 5672-5680.

* cited by examiner

PROCESSES FOR REMOVING PERFLUOROALKYL SUBSTANCES AND REGENERATING AN ADSORBENT USED WITH SAME

FIELD OF THE INVENTION

This invention relates generally to processes and apparatuses for removing and degrading perfluoroalkyl substances and more particularly to processes and apparatus in which a calcium base is utilized to convert the perfluoroalkyl substances into calcium fluoride, carbon dioxide, and water.

BACKGROUND OF THE INVENTION

Perfluoroalkyl substances (PFAS) are "forever chemicals" that are very stable and persist in the environment. PFAS are linked to harmful effects on the kidney, liver, blood, and immune system. Examples of PFAS are surfactants in industrial and consumer products, such as firefighting foams, alkaline cleaners, paints, non-stick cookware, carpets, upholstery, shampoos, floor polishes, fume suppressants, semiconductors, photographic films, pesticide formulations, food packing, masking tape, and denture cleaners.

Typical PFAS concentrations are pg/L to ng/L. The EPA advises <70 ppt of PFAS, so sites will need remediation. The EPA has a list of over 179 PFAS that are toxic.

While it is known to use adsorbent materials to adsorb PFAS to remove them PFAS, there is still the possibility that the adsorbed PFAS may leach into the environment from disposed adsorbent.

Accordingly, it would be desirable to have more effective and efficient ways to remove and degrade PFAS.

SUMMARY OF THE INVENTION

The present invention provides for the removal and degradation of PFAS. The PFAS are degraded with a calcium base to form calcium fluoride. Incomplete incineration of PFAS compounds can generate light fluorinated hydrocarbons, which is avoided in the reaction with a calcium base. Mineralization will minimize emission of light fluorinated hydrocarbons (which have extremely high global warming potentials compared to carbon dioxide).

Furthermore, it has been found that the adsorbent, which has removed PFAS from a contaminated stream, may be regenerated by desorbing the PFAS from the adsorbent with heat or a liquid phase desorbent such as water, methanol, or hydrocarbons and producing a effluent stream enriched in PFAS. The liquid desorbent could be separated from the PFAS prior to the thermal treatment in the presence of a calcium base or the entire effluent could be sent to the reactor for the thermal treatment.

Therefore, the present invention may be characterized, in at least one aspect, as providing a process for degradation of PFAS by: heating PFAS to provide a heated PFAS stream; and, introducing the heated PFAS stream to a vessel containing a calcium base so as to convert the PFAS into calcium fluoride, carbon dioxide, and water.

The PFAS may have a temperature between 400° C. to 925° C. when the heated PFAS stream is introduced into the vessel. The temperature may be between 525° C. to 825° C.

A molar ratio of calcium to fluoride in the vessel may be between 0.5 to 10.

The calcium base may include calcium hydroxide, calcium oxide, calcium carbonate, or combinations thereof. Alternatively, the calcium base may consist of calcium oxide.

The heated PFAS stream may be introduced to the vessel for a time between 0.5 seconds to 10 minutes.

The process may also include separating the calcium fluoride, carbon dioxide, and water into a stream comprising carbon dioxide and water and the solid calcium fluoride. The carbon dioxide may be removed in a carbon dioxide scrubber.

The PFAS may be heated in the absence of the calcium base.

In a second aspect, the present invention may be broadly characterized as providing a process for removal of PFAS by: removing PFAS from a contaminated stream with an adsorbent configured to selectively retain PFAS and provide a treated stream; desorbing the PFAS from the adsorbent, in a reaction zone, by heating the adsorbent in the presence or absence of a calcium base, wherein the desorbed PFAS are converted to calcium fluoride, carbon dioxide, and water; separating a vapor portion from an effluent from the reaction zone; and, recovering calcium fluoride from a solids portion of the effluent.

The adsorbent may include granular activated carbon, an ion exchange resin, an aluminosilicate, or combinations thereof.

The adsorbent may be a microporous aluminosilicate with an atomic ratio of silicon to aluminum greater than 50, or greater than 100.

The adsorbent may be a mesoporous aluminosilicate with an atomic ratio of silicon to aluminum greater than 50, or greater than 100.

The adsorbent may be a microporous silicate that is essentially free of aluminum.

The adsorbent may be a mesoporous silicate that is essentially free of aluminum.

The process may further include recycling at least a portion of the vapor portion to the reaction zone.

The desorbed PFAS may have a temperature between 525° C. and 825° C.

A molar ratio of calcium to fluoride in the reaction zone may be between 0.5 to 10.

The calcium base may include calcium hydroxide, calcium oxide, calcium carbonate, or combinations thereof.

The calcium base may consist of calcium oxide.

The process may further include: separating the calcium fluoride, carbon dioxide, and water into a stream comprising carbon dioxide and water and the solid calcium fluoride. The carbon dioxide may be removed in a carbon dioxide scrubber.

The PFAS may be heated in the absence of the calcium base.

In a third aspect, the present invention, generally, may be characterized as providing an apparatus for degradation of PFAS which includes: a vessel having a calcium base and configured to receive a heated PFAS stream comprising PFAS, wherein the calcium base is configured to convert the PFAS into calcium fluoride, carbon dioxide, and water; and, a heater configured to heat a stream comprising PFAS in the absence of the calcium base to provide the heated PFAS stream.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

As mentioned above, the present invention addresses PFAS degradation as well as the regeneration of adsorbent used to remove PFAS from contaminated streams. In general, PFAS are heated and then introduced to a calcium base which will degrade the PFAS into calcium fluoride, carbon dioxide, and water. By heating the PFAS first and then introducing the heated PFAS, the process is believed to be more energy efficient. Additionally, the interaction between solid and gas may lead to further efficiencies for the process.

Additionally, in some aspects the present invention provides for the regeneration of adsorbent that has adsorbed PFAS to remove the PFAS from, for example, a contaminated stream. The adsorbent may be heated to desorb or release the PFAS which are degraded in the presence of the calcium base. A liquid phase desorbent such as water, methanol, or hydrocarbons could be used to desorb the PFAS and produce an effluent stream enriched in PFAS. The liquid desorbent could be separated from the PFAS prior to the thermal treatment or the entire effluent could be sent to the reactor.

After the PFAS has been desorbed, the adsorbent may be utilized again to remove PFAS. Unlike traditional processes which dispose of the contaminated adsorbent, the present processes allow for the adsorbent to be reused, and the PFAS are not stored or disposed of where they may still pose a threat of environmental contamination.

It should be understood that PFAS includes compounds such as perfluorooctanoic acid (PFOA), perfluorooctane-sulfonic acid (PFOS), GenX, perfluorobutane sulfonic acid (PFBS), perfluoropentanesulfonic acid (PFPS), perfluoro-hexane sulfonic acid (PFHxS), perfluoroheptanesulfonic acid PFHpS), perfluorononanesulfonic acid (PFNS), or per-fluorodecanesulfonic acid (PFDS), Hexafluoropropylene oxide dimer acid (HFPO-DA). This list is not intended to be exhaustive, but merely exemplary. Additional PFA compounds, can be found, for example in the definitions provided by the EPA.

With these general principles in mind, one or more embodiments of the present invention will be described with the understanding that the following description is not intended to be limiting.

Figure 1:
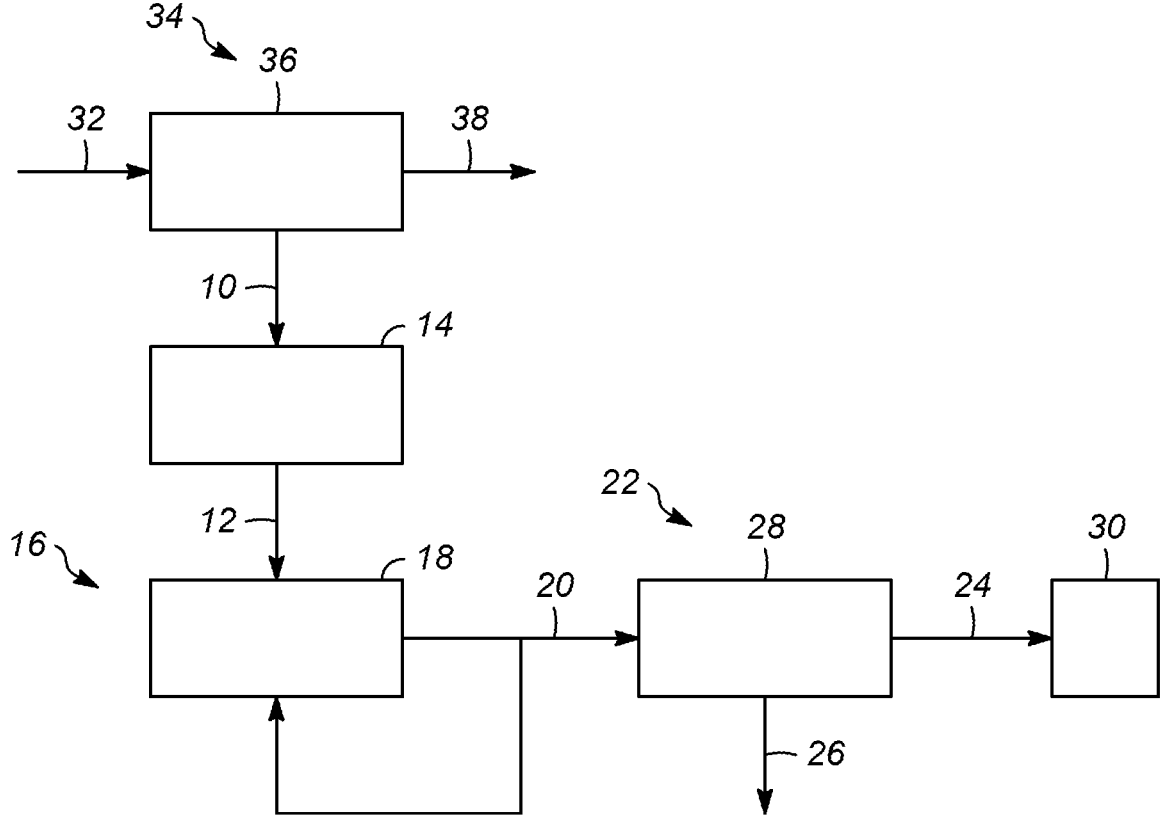
FIG. 1 is a process flow diagram according to one or more aspects of the present invention.

As shown in FIG. 1, in various aspects of the present invention, a stream of PFAS 10 is heated to provide a heated PFAS stream 12. The stream of PFAS 10 is heated in, for example, a heater 14. In a stream of PFAS, the PFAS are heated in the absence of a calcium base. For example, the PFAS stream 10 may be heated before being passed to a reaction zone 16 having a reaction vessel 18. The PFAS 10 may be heated to a temperature so that when the heated PFAS contact or are introduced to the calcium base, the PFAS have a temperature between 400° C. to 925° C., or between 525° C. to 825° C. Without being bound by theory, it is believed that the PFAS may partially degrade during the initial heating prior to entering the reactor. These partially degraded molecules may have increased reactivity in the reactor.

The heated PFAS stream 12 may be introduced into the vessel 18 which contains a calcium base. In the presence of the calcium base, the PFAS are converted into calcium fluoride, carbon dioxide, and water. The calcium base may include calcium hydroxide, calcium oxide, calcium carbonate, or combinations thereof. In some embodiments, the calcium base consists of calcium oxide. A molar ratio of calcium to fluoride in the vessel 18 may be between 0.5 to 10, or between 0.5 to 2. The PFAS may have a residence time in the vessel 18 and/or in the presence of the calcium base for a time between 0.5 seconds to 10 minutes.

An effluent 20 from the vessel 18 contains calcium fluoride, carbon dioxide, and water. Accordingly, the effluent 20 may be separated, in a separation zone 22, into a stream comprising carbon dioxide and water 24 and solid calcium fluoride 26. A centrifuge 28 may be used in the separation zone 22, however, other separation devices may be used such as, for example, a bag house. Additionally, carbon dioxide may be removed in a carbon dioxide scrubber 30. A portion of the effluent 20 may be passed back to the vessel 18 to minimize non-degraded PFAS from being released.

The PFAS stream 10 may be a PFAS enriched stream generated by removing PFAS from a contaminated stream 32. In the present application, "a PFAS enriched stream" means that at least 0.1% of the stream comprises PFAS.

For example, the contaminated stream 32 may be passed to a purification zone 34 containing a vessel 36 which contains an adsorbent configured to selectively retain PFAS and provide a treated stream 38. The adsorbent may be granular activated carbon, an ion exchange resin, or an aluminosilicate. For example, the adsorbent may be a microporous aluminosilicate with an atomic ratio of silicon to aluminum greater than 50, or greater than 100. The adsorbent may be a mesoporous aluminosilicate with an atomic ratio of silicon to aluminum greater than 50, or greater than 100. The adsorbent may be a microporous silicate or a mesoporous silicate that is essentially free of aluminum. Although depicted with only one vessel 36, it is contemplated that more than one vessel 36 containing the adsorbent is provided. The adsorbent in the multiple vessels 36 may be regenerated at different times.

The PFAS may be desorbed from the adsorbent to provide the PFAS enriched stream. Depending on the adsorbent, the PFAS may be desorbed with a solvent or with heat. In some embodiments, this may be a batch process. In some embodiments, this may be a continuous process. For example, a liquid phase desorbent such as water, methanol, or hydrocarbons could be used to desorb the PFAS and produce an effluent stream enriched in PFAS. The liquid desorbent could be separated from the PFAS prior to the thermal treatment or the entire effluent could be sent to the reactor. Alternatively, the PFAS may be concentrated by being adsorbed on the adsorbent, and then the adsorbent, with the PFAS, may be mixed with calcium base.

Therefore, an apparatus for degradation of PFAS may include a first vessel 36 which receives the contaminated stream 32 which includes PFAS. The first vessel 36 includes an adsorbent configured to selectively retain the PFAS. Under suitable conditions, the adsorbent may desorb the PFAS and provide the PFAS stream 10. A second vessel 18 includes a calcium base which converts the PFAS into calcium fluoride, carbon dioxide, and water. A heater 14 is provided to heat the PFAS stream 10 in the absence of the calcium base.

In an embodiment, instead of desorbing the PFAS into a PFAS stream, the present invention contemplates a mixture of adsorbent containing PFAS being heated in the presence of the calcium base. The heat will desorb the adsorbent and thus regenerate the desorbing. At the same time, the calcium base will degrade the PFAS.

EXPERIMENTS

PFOA (0.15 g) was dissolved in water (15 g), and UZM-50 (0.98 g) was added. UZM-50 was prepared according to the methods set forth in U.S. Ser. No. 10/632,454. The mixture was stirred for 1 day at room temperature. The solid was separated from the liquid through centrifugation. The UZM-50 was combined with water and centrifuged to rinse any non-adsorbed PFAS away. The PFOA loaded UZM-50 was dried at 80° C. on a rotovap rotary evaporator. The PFOA loaded UZM-50 (1.0 g) was combined with calcium oxide (1.42 g) and ground with a mortar and pestle. The solid mixture was then slowly poured into a glass reactor and, heated in a furnace at 525° C. for 20 min. After cooling, the solid was analyzed by XRD. XRD indicated the formation of calcium fluoride. It is believed that similar results will be shown when the PFAS are desorbed and heated and then introduced to the calcium base.

Temperature, Ca/F Ratio, and Time for Degradation

Additionally, PFAS (PFOA, PFOS, or HFPO-DA) was mixed with a calcium base (0.6-5 mol Ca/F) with a mortar and pestle. The solid mixture was poured into a glass reactor and heated in a furnace between 200° ° C. and 525° C. for 5-60 min. The solid was cooled and submitted for XRD—which indicated the presence of calcium fluoride.

Figure 2:
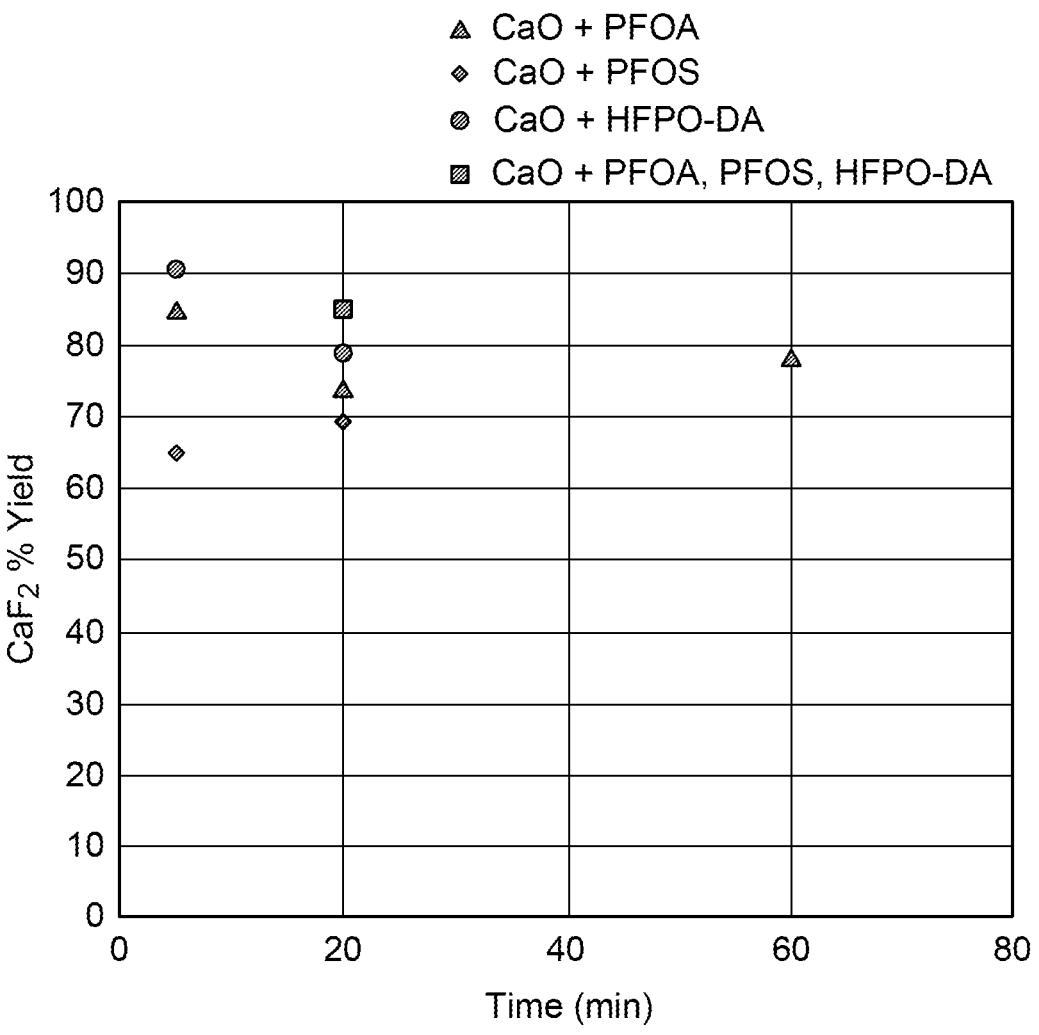
FIG. 2 is a graph showing experimental data comparing calcium fluoride yield vs. reaction time.

In FIG. 2, the depicted graph shows the relationship between the calcium fluoride yield and the reaction time between the PFAS and the calcium base. For the experiments of FIG. 2, a molar ratio of Ca/F was 1.3 and the PFAS had a temperature of 525° C.

Figure 3:
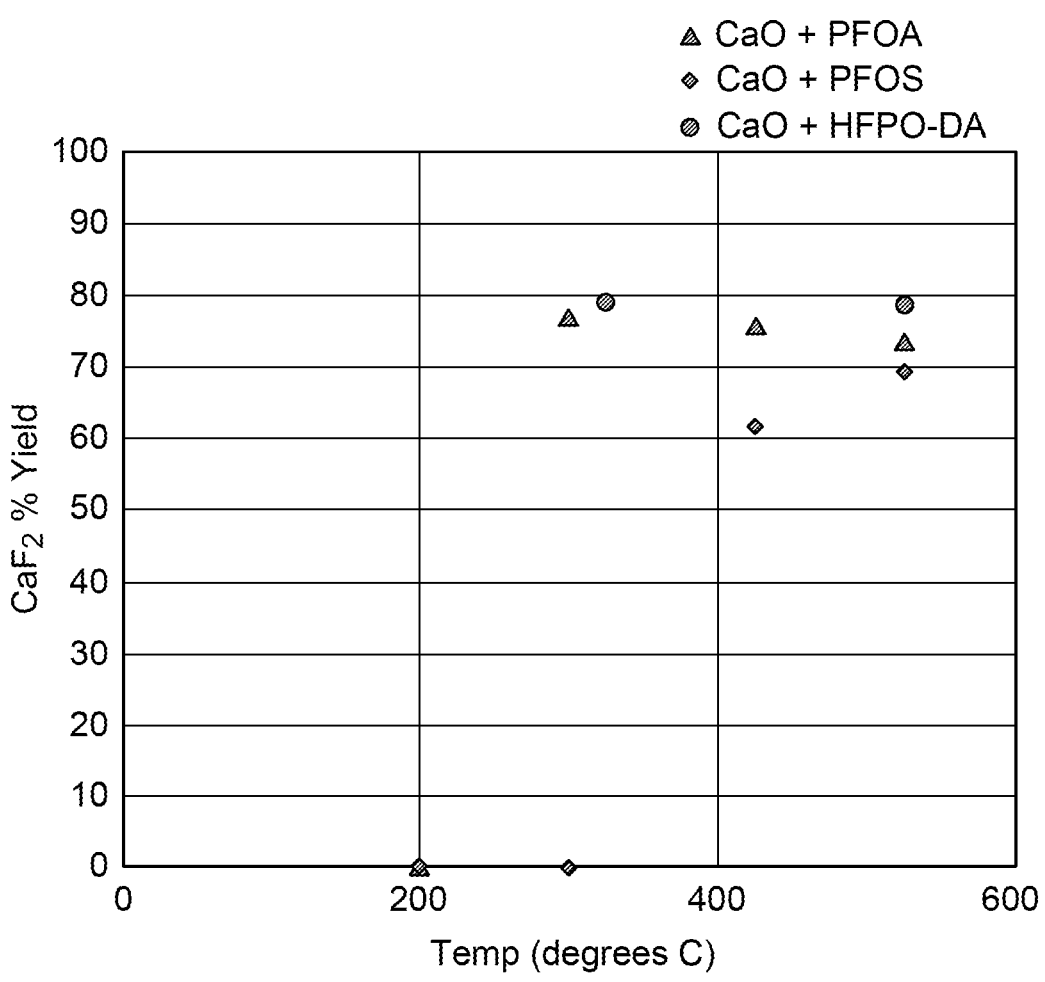
FIG. 3 is a graph showing experimental data comparing calcium fluoride yield vs. reaction temperature; and, FIG. 4 is a graph showing experimental data comparing calcium fluoride yield vs. calcium to fluoride ratio.

In FIG. 3, the depicted graph shows the relationship between the calcium fluoride yield and the temperature of the PFAS when exposed to the calcium base. For the experiments of FIG. 3, a molar ratio of Ca/F was 1.3 and the PFAS were exposed to the calcium base for 20 minutes.

Figure 4:
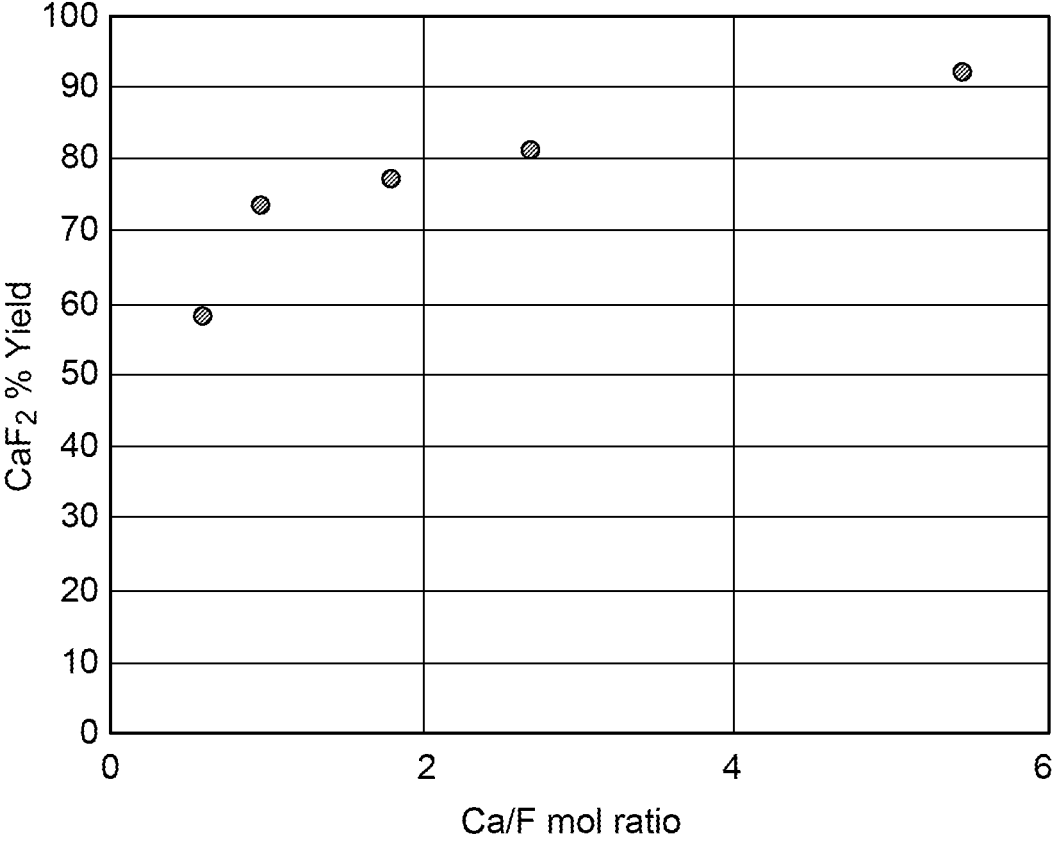

In FIG. 4, the depicted graph shows the relationship between the calcium fluoride yield and the molar ratio of Ca/F. For the experiments of FIG. 3, the PFAS had a temperature of 525° C. and the PFAS were exposed to the calcium base for 20 minutes.

As can be seen from FIGS. 2 to 4, the PFAS were successfully degraded with varying conditions.

Desorption of PFAS from GAC and Treatment with Calcium Oxide

GAC was shook with PFOA (2.18 g) in water (200 mL) at room temperature for 3 h. The GAC mixture was filtered to isolate the PFOA loaded GAC. The GAC was washed with water and dried on a rotovap to remove excess water. The GAC (10 g) was loaded into the top heating zone of a quartz reactor with nitrogen flow (150 cc/min). The lower heating zone of the reactor was loaded with 2 beds of calcium oxide (2.3 g each). The top heating zone reached 325° C., and the bottom heating zone reached 425° C. After heating for 1 h, the reactor was cooled. The CaO beds were submitted for XRD, and $CaF_2$ was detected.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a process for degradation of PFAS, the process comprising heating PFAS to provide a heated PFAS stream; and, introducing the heated PFAS stream to a vessel containing a calcium base so as to convert the PFAS into calcium fluoride, carbon dioxide, and water. An embodiment of the invention is one, any or all of prior embodiments in this paragraph up through the first embodiment in this paragraph, wherein the PFAS have a temperature between 400° C. to 925° C. when the heated PFAS stream is introduced into the vessel. An embodiment of the invention is one, any or all of prior embodiments in this paragraph up through the first embodiment in this paragraph, wherein the temperature is between 525° C. to 825° C. An embodiment of the invention is one, any or all of prior embodiments in this paragraph up through the first embodiment in this paragraph, wherein a molar ratio of calcium to fluoride in the vessel is between 0.5 to 10. An embodiment of the invention is one, any or all of prior embodiments in this paragraph up through the first embodiment in this paragraph, wherein the calcium base comprises calcium hydroxide, calcium oxide, calcium carbonate, or combinations thereof. An embodiment of the invention is one, any or all of prior embodiments in this paragraph up through the first embodiment in this paragraph, wherein the calcium base consists of calcium oxide. An embodiment of the invention is one, any or all of prior embodiments in this paragraph up through the first embodiment in this paragraph, wherein the heated PFAS stream is introduced to the vessel for a time between 0.5 seconds to 10 minutes. An embodiment of the invention is one, any or all of prior embodiments in this paragraph up through the first embodiment in this paragraph, further comprising separating the calcium fluoride, carbon dioxide, and water into a stream comprising carbon dioxide and water and the solid calcium fluoride. An embodiment of the invention is one, any or all of prior embodiments in this paragraph up through the first embodiment in this paragraph, further comprising removing the carbon dioxide in a carbon dioxide scrubber. An embodiment of the invention is one, any or all of prior embodiments in this paragraph up through the first embodiment in this paragraph, wherein the PFAS is heated in the absence of the calcium base.

A second embodiment of the invention is a process for removal of PFAS, the process comprising removing PFAS from a contaminated stream with an adsorbent configured to selectively retain PFAS and provide a treated stream; desorbing the PFAS from the adsorbent, in a reaction zone, by heating the adsorbent in the presence or absence of a calcium base, wherein the desorbed PFAS are converted to calcium fluoride, carbon dioxide, and water; separating a vapor portion from an effluent from the reaction zone; and, recovering calcium fluoride from a solids portion of the effluent. An embodiment of the invention is one, any or all of prior embodiments in this paragraph up through the second embodiment in this paragraph, wherein the adsorbent comprises granular activated carbon, an ion exchange resin, or an aluminosilicate. An embodiment of the invention is one, any or all of prior embodiments in this paragraph up through the second embodiment in this paragraph, wherein the adsorbent is a microporous aluminosilicate with an atomic ratio of silicon to aluminum greater than 50. An embodiment of the invention is one, any or all of prior embodiments in this paragraph up through the second embodiment in this paragraph, wherein the adsorbent is a microporous aluminosilicate with an atomic ratio of silicon to aluminum greater than 100. An embodiment of the invention is one, any or all of prior embodiments in this paragraph up through the second embodiment in this paragraph, wherein the adsorbent is a mesoporous aluminosilicate with an atomic ratio of silicon to aluminum greater than 50. An embodiment of the invention is one, any or all of prior embodiments in this paragraph up through the second embodiment in this paragraph, wherein the adsorbent is a mesoporous aluminosilicate with an atomic ratio of silicon to aluminum greater than 100. An embodiment of the invention is one, any or all of prior embodiments in this paragraph up through the second embodiment in this paragraph, wherein the adsorbent is a microporous silicate that is essentially free of aluminum. An embodiment of the invention is one, any or all of prior embodiments in this paragraph up through the second embodiment in this paragraph, wherein the adsorbent is a mesoporous silicate that is essentially free of aluminum. An embodiment of the invention is one, any or all of prior embodiments in this paragraph up through the second embodiment in this paragraph, further comprising recycling at least a portion of the vapor portion to the reaction zone. An embodiment of the invention is one, any or all of prior embodiments in this paragraph up through the second embodiment in this paragraph, wherein the desorbed PFAS have a temperature between 525° C. and 825° C. An embodiment of the invention is one, any or all of prior embodiments in this paragraph up through the second embodiment in this paragraph, wherein a molar ratio of calcium to fluoride in the reaction zone is between 0.5 to 10. An embodiment of the invention is one, any or all of prior embodiments in this paragraph up through the second embodiment in this paragraph, wherein the calcium base comprises calcium hydroxide, calcium oxide, calcium carbonate, or combinations thereof. An embodiment of the invention is one, any or all of prior embodiments in this paragraph up through the second embodiment in this paragraph, wherein the calcium base consists of calcium oxide. An embodiment of the invention is one, any or all of prior embodiments in this paragraph up through the second embodiment in this paragraph, further comprising separating the calcium fluoride, carbon dioxide, and water into a stream comprising carbon dioxide and water and the solid calcium fluoride. An embodiment of the invention is one, any or all of prior embodiments in this paragraph up through the second embodiment in this paragraph, further comprising removing the carbon dioxide in a carbon dioxide scrubber. An embodiment of the invention is one, any or all of prior embodiments in this paragraph up through the second embodiment in this paragraph, wherein the PFAS is heated in the absence of the calcium base.

A third embodiment of the invention is an apparatus for degradation of PFAS, the apparatus comprising a vessel comprising a calcium base and configured to receive a heated PFAS stream comprising PFAS, wherein the calcium base is configured to convert the PFAS into calcium fluoride, carbon dioxide, and water; and, a heater configured to heat a stream comprising PFAS in the absence of the calcium base to provide the heated PFAS stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for degradation of PFAS, the process comprising:

heating PFAS to provide a heated PFAS stream; and, introducing the heated PFAS stream to a vessel containing a calcium base so as to convert the PFAS into calcium fluoride, carbon dioxide, and water, wherein a molar ratio of calcium to fluoride in the vessel is between 1.0 to 10.

2. The process of claim 1, wherein the PFAS have a temperature between 400° C. to 925° C. when the heated PFAS stream is introduced into the vessel.

3. The process of claim 2, wherein the temperature is between 525° C. to 825° C.

4. The process of claim 1, wherein the calcium base comprises calcium hydroxide, calcium oxide, calcium carbonate, or combinations thereof.

5. The process of claim 1, wherein the calcium base consists of calcium oxide.

6. The process of claim 1, wherein the heated PFAS stream is introduced to the vessel for a time between 0.5 seconds to 10 minutes.

7. The process of claim 1, further comprising:

separating the calcium fluoride, carbon dioxide, and water into a stream comprising carbon dioxide and water and the solid calcium fluoride.

8. The process of claim 7, further comprising:

removing the carbon dioxide in a carbon dioxide scrubber.

9. The process of claim 1, wherein the PFAS is heated in the absence of the calcium base to a temperature between 400° C. to 925° C.

\* \* \* \* \*